G. Waters,
Lubricator.

N°. 67,469.  Patented Aug. 6, 1867.

Witnesses.
John H. Bagart
C. L. Fisher

Inventor.
G. Waters

United States Patent Office.

G. WATERS, OF CINCINNATI, OHIO.

Letters Patent No. 67,469, dated August 6, 1867.

---

IMPROVEMENT IN LUBRICATORS.

---

*The Schedule referred to in these Letters Patent and making part of the same.*

---

TO ALL WHOM IT MAY CONCERN:

Be it known that I, G. WATERS, of Cincinnati, county of Hamilton, State of Ohio, have invented a new and useful Improvement in Lubricators, of which the following is a full and clear description, reference being had to the accompanying drawings, making part of these specifications.

The nature of my invention consists in the construction of an oil-cup or lubricator for oiling the journals of shafting and other rotating or sliding machinery, whereof the reservoir containing the oil is secured by means of an elastic air-tight packing within the socket to which the tube is attached, from and through which the oil is conducted to the journals.

Figure 1:
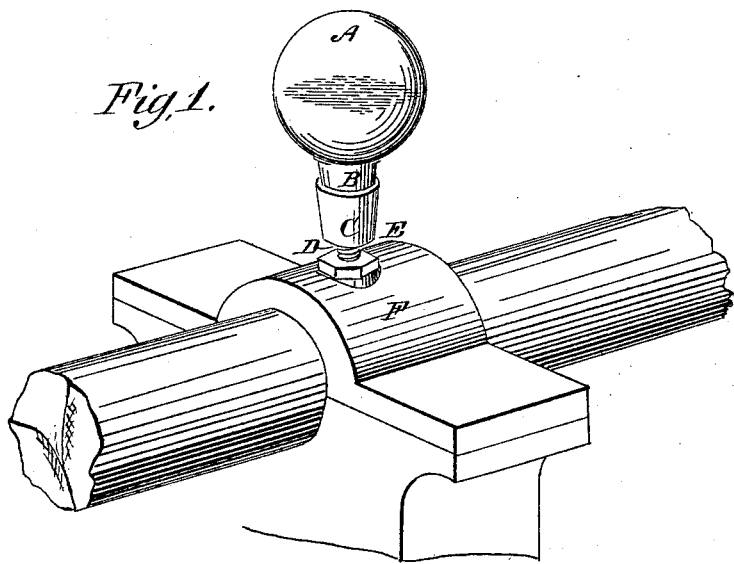
Figure 1 is a perspective view of my improved lubricator in position upon the box of a journal.
Figure 2:
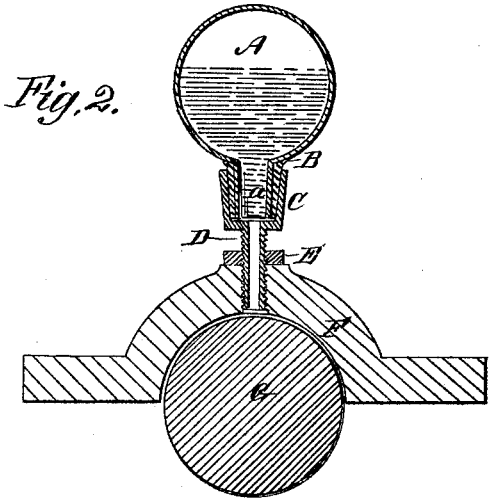
Figure 2 is a vertical section of the same.

In constructing lubricators of the character of mine it is important that it be so made that the joint shall be perfectly tight, and remain so, and that will permit of the ready removal of the reservoir and the replacing of the same without delay or trouble. To accomplish these objects I first provide a metal tube, D, having a screw-thread cut on its exterior surface, so that it may be screwed into the box until its lower end shall very nearly touch the journal, as represented clearly in fig. 2, in which F represents the cap or upper portion of the box, and G being the journal or shaft. To the upper end of this tube D I secure a cup-shaped socket, C, as shown in the drawings, these parts being cast or otherwise formed in a single piece if preferred. I then provide a spherical glass vessel, A, having a small tubular neck projecting from one side, there being no opening into this vessel except through this neck, which is made of proper size to fit into the socket C of the stem or tube D, and permit the insertion between the neck and the socket of an elastic ring or packing, B, to form a tight joint. This ring may be a piece of rubber, leather, or cork, the last being best adapted to the purpose, and the neck a of the reservoir should be made slightly conical, to permit it to be pressed in tight. The stem D, with its packing B, being suitably prepared and put into place, the reservoir A is then filled with oil or other lubricating material, and being inverted, has its neck forced into the socket C, with the packing surrounding it and making a tight joint. When the journal G is set in motion a very small quantity of the oil is drawn down through the tube D from the reservoir, its place being supplied by air which enters through the same tube; and in this way there is a continuous though very gradual supply of oil furnished automatically to the journal or bearing. As soon, however, as the journal ceases to move the flow from the reservoir ceases, and there is thus no waste of the material. By this manner of constructing the lubricator I secure a very simple, strong, and efficient device.

Having thus described my invention, what I claim, is—

A lubricator consisting of the glass reservoir A, attached to the stem D by means of the socket C and the elastic packing B, all constructed and arranged to operate as shown and described.

G. WATERS.

Witnesses:
C. L. FISHER,
JOHN H. BOGART.